United States Patent

Weise et al.

[15] 3,663,166

[45] May 16, 1971

[54] PLATINUM CATALYST FOR THE PRODUCTION OF HYDROXYLAMINE

[72] Inventors: Johannes Weise, Krefeld-Bockum; Hans Zirngibl, Duisburg; Heinz Heine, Krefeld-Uerdingen, all of Germany

[73] Assignee: Farbenfabriken Bayer Aktiengesellschaft, Leverkusen, Germany

[22] Filed: July 30, 1970

[21] Appl. No.: 59,718

Related U.S. Application Data

[62] Division of Ser. No. 727,664, May 8, 1968, abandoned.

[30] Foreign Application Priority Data

May 13, 1967 Germany..............................F 52 408

[52] U.S. Cl. ................................23/117, 23/190 A, 252/447
[51] Int. Cl. ....................C01g 1/00, C01c 1/00, B01j 11/00
[58] Field of Search..................23/190 A, 117; 252/447, 472

[56] References Cited

UNITED STATES PATENTS

| | | | |
|---|---|---|---|
| 3,406,011 | 10/1968 | Zirngibl et al.........................23/190 A |
| 3,275,567 | 9/1966 | Keith et al..........................252/472 X |
| 3,055,840 | 9/1962 | Koch, Jr. ...............................252/447 |

*Primary Examiner*—Oscar R. Vertiz
*Assistant Examiner*—Hoke S. Miller
*Attorney*—Connolly and Hutz

[57] ABSTRACT

Improved platinum catalyst with high life period, activity and selectivity for the production of hydroxylammonium salts by the reduction of nitric oxide with hydrogen, the catalyst being obtained by hydrolyzing the water soluble platinum compound at a pH of 4.5 to 9.0 and at a temperature of 20° to 100° C. in the presence of a carrier which is insoluble in strong acids, thereby precipitating platinum oxide hydrate onto said carrier in finely divided form and thereafter reducing the platinum oxide hydrate to metallic platinum.

5 Claims, No Drawings

PLATINUM CATALYST FOR THE PRODUCTION OF HYDROXYLAMINE

This application is a divisional application of application Ser. No. 727,664 which was filed May 18, 1968 and now abandoned.

This invention relates to a process for the preparation of a platinum catalyst which is suitable especially for hydrogenating NO into hydroxylamine.

The efficiency of a metallic catalyst depends on various factors, e.g. on the nature of metal deposition, the nature of the carrier, the chemical composition, the starting materials, the properties of the reducing agent and the reduction conditions.

The main features which characterize a good catalyst are essentially its efficiency in achieving good volume per time yields, its long life or the ease with which it can be reactivated after extended use and its specificity or selectivity, i.e. the avoidance or suppression of unwanted side reactions.

Platinum carrier catalysts have proved to be the best catalysts for the catalytic hydrogenation of NO in sulfuric acid solution to hydroxylammonium sulfate. The catalysts described in the literature, e.g. in Swiss Patent Specification No. 395,752, German Patent Specification No. 920,963, German Patent Specification No. 956,038 and German Patent Specification No. 945,752, either favor side reactions such as the formation of $NH_3$, $N_2O$ and $N_2$ or have an insufficient life time.

In accordance with the present invention it has now been found a process for the production of an highly efficient platinum catalyst on a carrier which is insoluble in acids, e.g. graphite and/or active charcoal, and which is suitable for the selective reduction of nitric oxide with hydrogen in sulfuric acid solution to the correspondent hydroxylammonium salt.

The process is characterized in that the platinum is first deposited as platinum oxide hydrate by hydrolysis of a divalent or tetravalent water soluble platinum compound in the presence of a carrier at a pH of 4.5 to 9.0 and at a temperature of 20° to 100° C., and this hydrate is then reduced to metallic platinum, the reduction being advantageously carried out with hydrogen in sulfuric acid solution.

The preparation of platinum catalysts via the hydrolysis of platinum compounds and the reduction of the hydroxide to the metal are principally known. Thus the hydrolysis of tetravalent platinum compounds has been described in detail in Gmelins' Handbuch der Anorg. Chemie, Platin, Part C, p. 47.

It is however surprising that, when the conditions according to the invention are observed, platinum is deposited in a particularly effective form, the catalysts produced in this way having very specific properties especially for the hydrogenation of NO to hydroxylamine. They combine long life time and a high activity in combination with excellent selectivity. In view of the efforts which have been undertaken for improving the properties of catalysts for the production of hydroxylamine to avoid the drawbacks of the known catalysts — especially insufficient life time, activity or selectivity-unexpected results were obtained by the process of invention, the more as always reproducable results are achieved. The amount and the concentration of the platinum salt solution as well as the amount of the carrier are adjusted to values to yield an effective amount of metallic platinum on the carrier after the final reduction, normally 5 to 20 g of platinum per kg of carrier are sufficient.

It has been found that, if optimum conditions of temperature, pH and the like are observed, the platinum hydroxide can always be deposited in the same finely divided and optimum form. The subsequent reduction to metallic platinum can then be carried out without special precautions. The metallic platinum is always obtained in the form best suited to the desired special properties provided that the platinum oxide hydrate is precipitated onto the carrier under the precautions of the invention.

In detail, preparation of the catalyst is carried out as follows: The solution of divalent or tetravalent platinum salt is buffered preferably with alkali metal acetate and the pH is then adjusted to 4.5 – 9.0, preferably 6.0 – 7.0 with alkali, e.g. NaOH or KOH, preferably with alkali metal carbonate. The platinum solution is then heated to a temperature of 20° to 100° C. with vigorous stirring for about 1 to 2 hours in the presence of a carrier which is insoluble in strong acids, preferably graphite or active carbon or mixtures thereof. The pH is kept constant during hydrolysis by the addition of alkali, preferably alkali metal carbonate solution. After removal from the reaction medium, the catalyst mass is washed free from salt and optionally reduced with hydrogen in sulfuric acid solution at a temperature of about 30° to 50° C., preferably 40° C.. The concentration of sulfuric acid should be about 2 to 4 N. The reduction can be carried out also with formic acid in aqueous suspension.

Platinum compounds which have proved to be effective are $H_2(PtCl_6) \cdot H_2O$ and $H_2(PtCl_4)$. Chloroplatinous acid can be prepared for example by the reduction of the corresponding tetravalent platinum compound with the stoichiometric quantity of hydrazine hydrochloride ($N_2H_4 \cdot 2$ HCl). (G. Bauer, Handbuch der präparativen anorg. Chemie, 2nd Edition, Volume II, page 1,366, 1962). The excess hydrochloric acid must be neutralized with soda solution before hydrolysis. Instead of chloroplatinous acid, its potassium salt $K_2(PtCl_4)$ may be used.

The catalyst can be used with excellent results in the known processes for the catalytic preparation of hydroxyl-ammonium salts from nitric oxide and hydrogen as described e.g. in German Patent Specification No. 968,363 or German Auslegeschrift No. 1,177,118, which are incorporated herein by reference.

The following examples are intended to explain the process of the invention more fully.

EXAMPLE 1

42.9 g of $K_2(PtCl_4)$ having a platinum content of 46.63 percent = 20.0 g of platinum are dissolved in 2,600 ml of water. Fifty-two grams of sodium acetate are added and the solution is adjusted to pH 6.5 with a small quantity of 25 percent soda solution. 1,980 g of graphite are stirred into this solution, a thin liquid paste being formed which is heated to 90° to 100° C. and kept at this temperature for 2 hours with vigorous stirring. Under these conditions, platinum is deposited quantitatively on the carrier. The product is then diluted with water and filtered and the filter cake is washed free from acid.

The catalyst mass is then suspended in 80 liters of 3.6N $H_2SO_4$ and treated with hydrogen for 2 hours at 40° C. with stirring. If reduction of the platinum oxide hydrate is to be carried out with formic acid, the filter cake is suspended in about 40 liters of water, heated to 70° to 80° C. and then kept at this temperature with stirring for ½ to 1 hour after the addition of 100 ml of formic acid (95 to 98 percent). The product is then filtered and washed free from acid.

CATALYST TEST

A catalyst prepared according to Example 1 is tested under the following conditions: A vessel equipped with a stirrer is charged with 1 liter of 3.6 N $H_2SO_4$ in which 25 g of the 1 percent platinum-graphite catalyst (=250 mg of platinum) are suspended. A mixture of 10 liters of NO and 17 liters of $H_2$ is passed through per hour with vigorous stirring at 38° C. The catalyst is separated from the hydroxylammonium sulfate solution after an operational period of 8 hours in each case and returned to the process with fresh 3.6 N $H_2SO_4$.

The selectivity was 90 percent after only three operational periods and then rose to 95 to 97 percent at which value it remained constant. The extent to which the reaction to $NH_2OH + NH_3$ took place was 88 percent, based on the amount of NO used.

EXAMPLE 2

Fifty grams of $H_2(PtCl_6) \cdot H_2O = 20.0$ g of platinum are dissolved in 250 ml of water. 5.35 g of solid hydrazine hydrochloride ($N_2H_4 \cdot 2\ HCl$) are added in portions to this solution in the course of one-half hour with stirring. Evolution of nitrogen takes place and the solution turns dark red. It is now heated on a steam bath until the evolution of gas ceases and is then cooled to room temperature and made up to 2,800 ml with water. This solution of divalent platinum in hydrochloric acid is treated with 52 g of sodium acetate and the pH is adjusted to 6.5 by the addition of a 25 percent soda solution. A mixture of 1,580 g of graphite and 400 g of active charcoal is introduced into this solution with stirring. The mixture is then heated for 2 hours at 90° to 100° C.. The resulting pasty but still stirrable mass is worked up according to Example 1.

EXAMPLE 3

50.0 g of $H_2(PtCl_6) \cdot H_2O$ = 20.0 g of platinum are dissolved in 3.0 liters of water and adjusted to pH 6.5 with soda solution. 1,980 g of graphite are stirred into this solution and the solution is rapidly heated to boiling temperature on a water bath with vigorous stirring and the pH is kept at 6.5 at this temperature by the addition of soda solution. Hydrolysis terminates after 1 to 2 hours. The reaction mixture is diluted with water and filtered and the filter cake is washed free from Cl. The catalyst mass, which is still moist after suction filtration, is suspended in 80 l of 3.6 N $H_2SO_4$ and reduced with $H_2$ at 40° C..

CATALYST TEST

A catalyst prepared according to Example 3 had a selectivity of 90 percent after five operational periods and a reaction rate to $NH_2OH + NH_3$ of 85 percent.

The standard catalyst prepared in a one step process by the reduction of chloroplatinic acid with formic acid in the presence of a carrier had a selectivity of only 80 percent under these conditions.

What is claimed is:

1. In the process of producing hydroxylammonium salt by the selective reduction of nitric oxide with hydrogen in sulphuric acid solution in the presence of a platinum carrier catalyst, the improvement which comprises employing as said catalyst, a catalyst produced by the process consisting of precipitating an effective amount of platinum oxide hydrate onto a carrier which is graphite, active charcoal or a mixture thereof by hydrolyzing a water soluble platinum compound at a pH of about 4.5 to 9.0 and at a temperature of about 20° to 100° C. and thereafter reducing said precipitated platinum oxide hydrate to a metallic platinum.

2. Process according to claim 1 wherein the water soluble platinum compound is a member selected from the group consisting of hexachloro platinic acid, tetrachloro platinous acid and the potassium salts of tetrachloro platinous acid.

3. Process according to claim 1 wherein the hydrolyzing is carried out at a pH of from about 6.0 to 7.0 and at a temperature of from about 70° to 100° C.

4. Process according to claim 1 wherein the reduction of the platinum oxide hydrate is carried out with hydrogen in sulfuric acid solution.

5. Process according to claim 1 wherein the reduction of the platinum catalyst is carried out with formic acid in aqueous solution.

* * * * *